UNITED STATES PATENT OFFICE.

KIRK BROWN, OF MONTCLAIR, AND DONALD S. KENDALL, OF EAST ORANGE, NEW JERSEY, ASSIGNORS TO CONDENSITE COMPANY OF AMERICA, OF BLOOMFIELD, NEW JERSEY, A CORPORATION OF NEW JERSEY.

CONDENSATION PRODUCT AND METHOD OF PREPARING SAME.

1,263,031. Specification of Letters Patent. Patented Apr. 16, 1918.

No Drawing. Application filed March 30, 1917. Serial No. 158,528.

*To all whom it may concern:*

Be it known that we, KIRK BROWN, a citizen of the United States, residing at Montclair, in the county of Essex and State of New Jersey, and DONALD S. KENDALL, a citizen of the United States, residing at East Orange, in the county of Essex and State of New Jersey, have invented certain new and useful Improvements in Condensation Products and Methods of Preparing Same, of which the following is a specification.

Our invention relates to condensation products of phenol or homologues thereof and substances containing the methylene radical in condition to combine with the phenolic body, with special reference to the anhydrous polymers of formaldehyde known as paraformaldehyde or paraform, especially tri-oxy-methylene.

Our special object is to form a definite liquid intermediate condensation product having certain advantageous properties and to provide an improved process for producing such intermediate product and subsequently producing therefrom an infusible and insoluble final product. One of our objects also is to provide an improved condensing or catalytic agent which is especially advantageous in forming the intermediate product referred to and to provide an improved method of using a condensing agent in a process such as we have referred to.

Briefly, our preferred process consists in reacting on an anhydrous phenolic body, preferably a liquid homologue of phenol, with anhydrous paraformaldehyde, such as tri-oxy-methylene, in proportions suitable to produce a final infusible and insoluble product upon the application of sufficient heat. The initial reaction is induced by the application of heat and the use of a suitable catalyst. After the reaction has started, the external heat is discontinued. The reaction which is thus induced is exothermic and continues until the desired intermediate product is formed, when the evolution of heat within the mass ceases. This exothermic reaction has a perfectly definite ending or stopping place when the intermediate product has been formed, provided that suitable means are provided, such as a water jacket about the apparatus having a cooling surface of sufficient area, to prevent the temperature due to the exothermic reaction from rising too rapidly. The final infusible product may be prepared from this intermediate product whenever desired by the application of external heat.

The intermediate product preferably formed as described above is made from substances which are entirely anhydrous and therefore the intermediate product formed contains no water except a slight amount, resulting from the reaction itself. The water resulting from the reaction, however, is largely expelled during the exothermic reaction by which the product was formed. The intermediate product contains no solvents and also contains no ammonia or products of ammonia, as is the case with a composition formed from a phenolic condensation product with hexa-methylene-tetramin. The intermediate product is liquid at room temperature and is a definite product of a considerable uniformity in composition and characteristics, because of the fact that the exothermic reaction by which the product is formed always has a definite ending at the time when the evolution of heat within the mass ceases.

The product described is found to have high dielectric properties. In this connection it should be noted that any slight amount of water remaining in the product after the exothermic reaction is entirely the product of reaction, and therefore is pure water, which is a good dielectric. Impure water, on the other hand, is not a dielectric and accordingly products formed from reagents containing impure water (such as formaldehyde solution) are of decreased dielectric value when any water is left in the product, the impure initial water contaminating the pure water of reaction.

We have found that the reaction between paraformaldehyde and a cresol will not start, or will only start very slowly, at the moderate temperature which is found desirable in our process, namely from about 140° F. to 160° F., unless a suitable condensing agent is used. The reaction may be induced quickly by the application of moderate heat in the presence of a suitable base, preferably calcium. We have found, however, that an improved result is achieved when the condensing agent used is a salt of the desired base, preferably calcium, and a phenolic substance, such as cresylic acid, this salt being used in compressed solid bodies. The salt thus formed, preferably calcium cresolate, is well adapted for the desired purpose, because of the fact that it does not become contaminated by or mixed with the reagents or products of reaction, but may be introduced into the liquid reaction mass in solid homogeneous form and removed after the reaction has taken place. Thus in our preferred process the calcium cresolate is used in the form of solid balls or small masses which are suspended in the liquid mixture of reagents in wire cages or skeleton containers which are drawn up out of the liquid reaction product at or before the time when the exothermic reaction is completed. In case calcium or other base is used as the condensing agent, the same is found at the end of the reaction mixed with a greater or less amount of gummy reaction product which sticks to the bottom of the vessel in which the reaction is carried out, and is difficult to fully remove therefrom. No such difficulty arises when the agent which we have described above is used.

It will be observed that in the process of forming the intermediate product described above the automatic stoppage of the reaction at the end of the exothermic action is important because thereby a very definite intermediate product is formed. This stoppage occurs invariably when the starting temperature is moderate, as stated, and proper regulation is effected of the exothermic reaction, so that the temperature of the latter will not rise much above 160° F. This regulation will be automatic when the apparatus has a water jacket providing a sufficiently large cooling surface. The proportionate amount of surface will vary with the bulk of the reagents. In contradistinction to this, the usual process in which the reagents are initially used in suitable proportions for forming a final infusible product is characterized by an arbitrary or enforced stoppage of the reaction when it is thought that the reaction has proceeded sufficiently far to form a desired intermediate product. In such a case, the intermediate product formed is of a less definite character than that described herein, because of the impossibility of determining with absolute accuracy when the reaction has proceeded to any desired stage.

In the step of producing the final infusible product from the intermediate product described, the application of heat alone is necessary, no counteracting pressure being required unless the reaction is carried on too violently.

As an example of our improved process the following may be given:—Liquid anhydrous cresol and tri-oxy-methylene are dissolved together in a suitable vessel having suitable proportions of cooling surface to contents as mentioned above, the tri-oxymethylene being present in proportions somewhat greater than equi-molecular. Compressed balls of calcium cresolate are suspended within the bath as described above, and these can be used repeatedly without apparent loss because of chemical action. The reaction is now induced by the application of moderate heat, for example, from 140° F. to 160° F., which heat need only be applied for a very short time, the rise of temperature within the mass, as indicated by a thermometer, showing when the exothermic reaction has started, at which time the external heat is withdrawn. The heat of the reaction mass will now rise but should be regulated as by means of a water jacket, as described, if it rises too rapidly. Thus the heat of the reaction should be held down to approximately 160° F. during the whole of the exothermic action. When this is done, the reaction will gradually cease after the intermediate product described has been formed, as will be indicated by a fall in temperature. After the exothermic action has ceased and the intermediate product has been formed, the final product may be formed by heating the intermediate product without counteracting pressure to a temperature of approximately from 180° F. to 210° F. for a time of five to six hours, at the end of which time the final infusible and insoluble product has been formed. During this reaction porosity is not caused by bubbling within the mass in the absence of counteracting pressure. The final product may also be formed quickly by greater heats, if desired, by the well known methods.

The condensing agent described is prepared by heating lime and cresol or cresylic acid, in substantially equimolecular proportions, and stirring them together, with the evolution of water. The calcium cresolate formed is dried, and compressed in balls. Phenol might be substituted for the cresylic acid in the above, with the formation of calcium phenolate. The agent is unchanged during its suspension in the reacting mass and is drawn out when it has performed its function to be used over again. This part of our invention consists in the preparation and use of a salt, formed by the combination of a suitable base with an acid such that the resultant salt will not react with the ingredients of the reacting mass in which it is introduced, the salt being in solid compressed form. As stated, this prevents the agent used from being mixed with a sticky resinous product which is difficult to remove from the vessel, as in the case of calcium used in the ordinary way. Also there are no traces of the condensing agent in the product, after the agent has been lifted from the liquid mass, and no water is evolved by the formation of phenolate or cresolate of a base within the reacting mass, as is the case to some extent when various basic agents are used. This branch of our invention is not limited in its usefulness to the particular process described above, but is of wide applicability, as will be evident.

The described process may be carried out, in some of its aspects, without the use of a condensing agent. In this case, however, the reaction must be initiated at a higher temperature than that described (namely at about 190° F.), and proceeds more sluggishly than in the other case described, so that it is necessary to apply some external heat after the reaction has started to maintain the mass at reacting temperature. The mass may thus be maintained at approximately 190° F., until the end of the exothermic reaction, which is indicated by a considerable drop in temperature if the rate of supply of external heat is maintained the same as before that point is reached. The supply of external heat is then shut off, and an intermediate product, liquid at room temperature, and similar to that formed in the other case, is produced. This process requires more time than that in which the condensing agent is used, and the loss of formaldehyde in vapor is greater, if an open vessel is used.

What we claim is:—

1. A process of forming a phenolic condensation product, comprising, mixing together a phenolic substance and an active methylene-containing substance in proportions suitable to produce a final infusible and insoluble product, placing the mixture in a vessel having a relatively large cooling surface in proportion to the bulk of the contained mixture, applying moderate heat to start reaction, and then permitting the reaction to proceed under its own heat only until the evolution of heat ceases and an intermediate product, liquid at room temperatures, is formed, substantially as set forth.

2. A process of forming a phenolic condensation product, comprising, mixing together a phenolic substance and an active methylene-containing substance in proportions suitable to produce a final infusible and insoluble product, placing the mixture in a vessel having temperature-regulating means sufficient for the desired purpose, applying heat sufficient to start reaction until exothermic reaction has started, and permitting the reaction to proceed to the stopping point of the exothermic action, under regulation such that the temperature thereof will not rise above or fall below moderate amounts, substantially as set forth.

3. In a process of forming a phenolic condensation product, involving the use of a phenolic substance and an active methylene-containing substance in proportions suitable to produce a final infusible and insoluble product, the steps of applying external heat just sufficient to induce an exothermic reaction, and then permitting the reaction to proceed under its own heat until the evolution of heat ceases, and an intermediate product, liquid at room temperature, is formed, the heat of the exothermic reaction being regulated to not exceed 170° F., substantially as set forth.

4. In a process of forming a phenolic condensation product, involving the use of a phenolic substance and an active methylene-containing substance in proportions suitable to produce a final infusible and insoluble product, together with a suitable condensing agent, the steps of applying external heat at a temperature of from 140° F. to 160° F., to induce reaction, withdrawing the external heat when the exothermic reaction starts and the temperature rises, and permitting the exothermic reaction to proceed to its stopping point, under regulation such that the temperature thereof will not rise above 170° F., substantially as set forth.

5. A process of forming a phenolic condensation product, comprising, mixing together an anhydrous phenolic body and anhydrous paraformaldehyde in proportions suitable to produce a final infusible and insoluble product, in the presence of a condensing agent suitable for inducing reaction between such substances; applying moderate heat to start reaction, and thereafter continuing reaction under heat produced thereby, only, until evolution of heat ceases, while the temperature of the reaction is held down, by application of cooling means, an intermediate product, liquid at room temperature, being formed; and again applying external heat until the final, infusible product desired has been formed, substantially as set forth.

6. In a process of forming a phenolic condensation product, involving the use of a phenolic substance and an active methylene-containing substance, the steps of suspending within the liquid mass a condensing agent in solid form within a skeleton container, inducing reaction by application of heat, and withdrawing the container and agent therein before the mass hardens, substantially as set forth.

7. The process of forming a condensation product from phenolic and active methylene-containing bodies, which comprises inducing reaction between the said reagents in the presence of a condensing agent, which consists of a compressed salt of a suitable base and an acid such that the resultant salt will not react with the ingredients of the reacting mass in which it is introduced, and removing said agent from the reacting mass before the latter has hardened, substantially as set forth.

8. In a process of forming a phenolic condensation product from a fluid mixture of phenolic and active methylene-containing bodies, the steps of placing therein calcium cresolate as a condensing agent, and inducing reaction by the application of heat, substantially as set forth.

9. In a process of forming a phenolic condensation product from a fluid mixture of phenolic and active methylene-containing bodies, the steps of placing therein a condensing agent comprising a salt of calcium and a phenolic substance, such that the same will not react with the ingredients of the reaction mass, and inducing reaction by the application of heat, substantially as set forth.

This specification signed and witnessed this 22nd day of March, 1917.

KIRK BROWN.
DONALD S. KENDALL.

Witnesses:
SANDFORD BROWN,
FRIDA WESTLE.